United States Patent [19]
Hill

[11] 4,242,198
[45] Dec. 30, 1980

[54] REDUCTION OF MAGNESIUM AND OTHER CATIONS IN PHOSPHORIC ACID

[75] Inventor: Richard N. Hill, Lakeland, Fla.

[73] Assignee: W. R. Grace & Co., New York, N.Y.

[21] Appl. No.: 19,976

[22] Filed: Mar. 12, 1979

Related U.S. Application Data

[63] Continuation of Ser. No. 868,358, Jan. 10, 1978, abandoned.

[51] Int. Cl.$^3$ .............................................. B01D 15/04
[52] U.S. Cl. .............................. 423/321 R; 210/665; 210/666; 210/669; 210/678; 210/687; 210/777
[58] Field of Search .................. 210/27, 28, 30 R, 35, 210/38 A, 52, 53, 54, 75, 80, 82, 25; 423/321 R

[56] References Cited

U.S. PATENT DOCUMENTS

| | | | |
|---|---|---|---|
| 2,773,830 | 12/1956 | Farmer et al. | 210/35 |
| 2,968,528 | 1/1961 | Tuttle et al. | 423/321 R |
| 3,192,013 | 6/1965 | Young | 423/321 R |
| 3,492,092 | 1/1970 | Higgins | 423/321 R |
| 3,764,655 | 10/1973 | Ehlers et al. | 423/321 R |
| 3,907,680 | 9/1975 | Hill | 210/75 |

FOREIGN PATENT DOCUMENTS 47-15457 9/1972 Japan ................................. 423/321 R

*Primary Examiner*—Ivars C. Cintins
*Attorney, Agent, or Firm*—Charles L. Harness

[57] ABSTRACT

Improvement in the reduction of Mg, Ca, Na, K and Al in crude phosphoric acid using an ion exchange resin bed, comprising preclarifying the feed acid with flocculant polymer and placing a filter aid precoat on the resin bed. As part of the preclarification process, a compatible soluble sodium compound, such as sodium carbonate, is added to the feed acid to speed the flocculation process.

12 Claims, No Drawings

REDUCTION OF MAGNESIUM AND OTHER CATIONS IN PHOSPHORIC ACID

This is a continuation of application Ser. No. 868,358, filed Jan. 10, 1978, now abandoned.

This invention is directed to removal of substantial percentages of magnesium, calcium, sodium and potassium, plus up to 15 to 20% removal of aluminum, from crude wet process phosphoric acid.

The invention involves improvements in the known process of removal of magnesium ion from crude wet process acid using a strong acid cation exchange resin. For certain uses it has been found desirable to reduce the amount of magnesium ions in phosphoric acid, particularly when the acid is used to make liquid (i.e., N-P-K) fertilizers. Liquid fertilizers produced with phosphoric acid high in magnesium exhibit a tendency to form crystals. After standing these crystals grow until they become too large to pass through dispensing nozzles, pipes, valves, and pumps. For example, in one case an 8-8-8 liquid fertilizer, made with 54% $P_2O_5$ merchant acid containing 0.63% MgO, was very fluid for about 5 days after being produced. During the next 4 days difficulty was encountered in keeping the spray nozzles clear. After fifteen days crystals up to 2 to 3 inches long had formed and it was impossible to get the solution to flow through the pipes.

Low magnesium phosphoric acid, i.e. about 0.4% MgO or less at 54% $P_2O_5$ concentration, generally is accepted as giving satisfactory shelf life for most liquid fertilizer blends. Usually the lower the magnesium content the longer the shelf life.

At least partial removal of some of the other cations (e.g., Ca, Na, K, and Al) is also beneficial when producing super phosphoric acid of 68 to 72% $P_2O_5$. This invention will accomplish such removal.

As merchant grade phosphoric acid is concentrated, magnesium is one of the few cations that does not readily crystallize (as compounds of magnesium), because the solubility of such magnesium compounds is not appreciably reduced by concentrating the acid.

Merchant grade phosphoric acid at 30% $P_2O_5$ and 0.35% MgO representing a MgO: $P_2O_5$ ratio of 0.35/30=0.01167 will at 54% $P_2O_5$ have a 0.63% MgO content and at 70% $P_2O_5$ will show a 0.82% MgO content. The ratio will remain constant in the acid per se, even on prolonged standing, and little or no Mg-containing crystals will form. On the other hand, in these same acids the concentration of calcium, sodium, potassium, etc., will decrease as the acid is evaporated and concentrated, because during concentration these cations exceed their respective solubility products, combine with anions to crystallize, and settle out. The decrease in their concentration, however, will not be as great as when the acid is treated with a strong acid cation resin, owing to their at least partial prior removal by the resin. As noted, however, if high magnesium acid is made up into liquid fertilizer (N-P-K), crystals will begin to form on standing.

My invention thus provides at least two benefits: (1) By reducing the amount of Mg, it improves shelf life of N-P-K liquid fertilizers made from the Mg-reduced phosphoric acid. (2) By reducing the amount of Ca, K, Na, and Al it decreases the precipitates containing these elements that form when merchant grade phosphoric acid is concentrated and/or allowed to stand.

My invention involves the use of a preclarified acid and a filter aid precoat on the resin bed. Body feed filter aid may also be used (i.e., addition of filter aid into the feed acid). In addition, some of the preferred embodiments of my invention include various stages of flushing the resin bed and its regeneration. For example, one of the modifications includes the concept of recovering $P_2O_5$ values and/or the removed cations and sending same to a second train in a wet process phosphoric acid production plant. Also, in a preferred embodiment I use a dilute acid feed (20-35% $P_2O_5$ and even more preferably, 25-32% $P_2O_5$). Acids of greater strength, up to 55% $P_2O_5$, may be used as feed but with certain modifications and reduced efficiency.

THE PRIOR ART

Ion exchange resins have been used to remove magnesium and other ions from crude phosphoric acid in the past. See, e.g., U.S. Pat. No. 3,192,013, Example 10, using a feed of 53% $P_2O_5$ with Rohm and Haas Amberlite IR-120 resin which is a strong acid cationic resin. The instant invention offers improvement over that process, including among others the use of a preclarified feed, perlite or other filter aid added to the feed, and a filter aid precoat on the resin bed.

THE APPARATUS OF THIS INVENTION

The resin can be any one of several strong acid cation types, well known in the art. These resins, as bought, generally should be soaked in water for several hours, then treated with an 8% sulfuric acid solution to be sure they are in the acid form before using. The above treatment may be done in the column if desired. One of the resins of preference is Rohm and Haas IR-120-H. This is a strong acid cation resin being polystyrene, cross-linked with divinyl benzene. It has been found to be quite stable in phosphoric acid solutions. Another candidate is Dow 50W-X ion exchange resin, which is equally suitable. In general the more highly cross-linked the resin, the greater is its capacity and stability.

EXAMPLE 1

Using the apparatus as above described, with Rohm and Haas IR-120-H resin, flow of 27% treated, preclarified filtrate from the phosphoric plant was begun into the ion exchange resin bed. (This feed was prepared as described in "Clarified Acid Feed", below). This was continued for 3.7 hours, providing a total of 69.3 pounds of acid. Average residence time of acid in the chamber was approximately ½ hour based on void volume. Samples of the acid were taken from time to time to analyze for cations. MgO, used as a control in the exit acid (i.e., an indicator to show progress of the adsorption for all the cations being adsorbed) was initially about 0.01% in the exit acid, and it was maintained at substantially this low level for about 1.5 hours then gradually rose to 0.21% (which was the same as the feed) over the next 2.2 hours at which point the flow was discontinued. Visual inspection of the perlite layer on top of the resin bed showed that it had picked up considerable solids.

After the flow had been discontinued as above described the bed was treated as follows. First it was downward washed with 8% (suitably 2-8%) sulfuric acid (which had been used in a previous run as final regeneration acid and adjusted to 8%) to flush out interstitial phosphoric acid to storage.

Next the column was backwashed (counter currently flushed) with 8% sulfuric acid (suitably 2-8%) to a point just below the layer of filter aid cake and solids. This disturbs the easily dispersable solids on top of the layer of filter aid, as well as the filter aid, both of which now may be removed by either overflowing to an outlet or by suction into a storage container maintained under slight vacuum. After substantial removal of the solids the entire column was then back washed with water at a rate sufficient to rearrange the resin beads and minimize short circuiting during the next cycle. (This technique is well known to those skilled in ion exchange resin technology and need not be further discussed here. Instead of backwashing with water as noted, the bed can also be backwashed with more dilute sulfuric acid, up to 8%). Back washing was then terminated; the bed was allowed to settle and downward flow of 8% sulfuric acid solution (8-25% is suitable) started to regenerate the resin. It has been found that approximately 2 to 10 equivalents of sulfuric acid per liter of "wet" resin has been required for proper regeneration.

The above treatment usually takes 1-8 hours. After regeneration, a portion of previously displaced phosphoric acid is now used to displace the residual sulfuric acid, part of which is saved for initial displacement of filter cake in a subsequent run. Excess displaced sulfuric acid and phosphoric acid may now be sent to another phosphoric acid train or to a waste treatment plant. The bed is now in condition to be used again and the flow of acid to be treated is resumed. Following this the bed cycle is repeated through the steps of magnesium absorption, forward and back flushing, regeneration, and magnesium absorption again.

The above bench scale work was carried out at room temperature and ambient conditions. However, under commercial conditions the feed acid will be much hotter, e.g., about 130° F. The resin bed is expected to work at these temperatures, and indeed up to about 260° F. and higher.

When the resin bed is used with about 30% acid as above described about 60 to 95% or more of the Mg can be removed, and about 90% of the starting $P_2O_5$ can be recovered, if the bleed off streams can be utilized in another phosphoric acid train.

I prefer perlite as the filter aid. Filter aid grade perlite is well known and is available commercially. It is made by "popping" mineral perlite in a furnace, i.e., heating it at about 1500° to 2200° F. so that the contained water forms bubbles in the softened glass, whereby the particles are expanded to 15 to 20 times their original volume.

Clarified Acid Feed

As noted, I require a preclarified acid. I have found that removal of substantially all suspended organic and inorganic material in the acid greatly improves resin efficiency and extends resin life.

I prepare the feed as follows. Starting with so-called Number One Filtrate (i.e., conventional filtrate from the first filtration of wet process phosphoric acid), this filtrate, 22-35% $P_2O_5$, is pumped to an agitated mixing tank where a soluble sodium compound such as sodium carbonate, sodium hydroxide, sodium phosphate, sodium sulphate, etc., is added and thoroughly mixed into the acid. (I prefer to use sodium compound at a rate of about 0.1% to 2.0% by weight of the $P_2O_5$ in the phosphoric acid, and even more preferably, about 1%. As the sodium compound, I prefer sodium carbonate.) In this step the sodium ions react with silicofluoride ions to form insoluble particles of sodium silicofluoride. These particles "weight" the flocs formed by the flocculant polymer added in the next step and thus cause the flocs to settle faster. The sodium-compound-treated crude acid is now pumped to the head box of a mixing launder, where a polymeric flocculant is added. The launder provides partial baffles so the polymer-filtrate mixture must follow a zig-zag path before discharging into the clarifier. This provides a gentle but thorough mixing and cooling action. Polyhall M295, a polyacrylamide-type flocculant commercially available from Stein, Hall & Co., Inc. of New York, N.Y., is suitable, at a wt. concentration in water of about 0.1%. This concentration can be varied from about 0.005 to about 0.4% by wt. in water. The Polyhall solution is added to the filtrate to provide about 0.25% to 2.0% by volume of the 25% to 35% filtrate, preferably about 0.8% by volume. The mixture discharges into a clarifier, as below discussed.

Numerous other flocculants are available for clarification. Examples include water soluble high molecular weight synthetic polymers, guar, etc.

The polyacrylamides and the hydrolyzed polyacrylonitrile resins and their salts and derivatives are particularly useful. Flocculants are used conventionally in the phosphoric acid industry in settling higher concentrations of acid, e.g., 42%, 52%, and 54%. Such flocculants are available commercially and are useful in this invention.

Instead of a launder (as described above), a mix tank can be used, but care must be taken to stir very slowly, so as not to disintegrate the flocs. In fact, mixing can be done in any conventional mixing vessel providing low shear.

The mix discharges into a clarifier. The clarifier is a standard piece of equipment Relatively speaking it has a shallow depth to diameter ratio, e.g., suitably 1:6. It may contain a stilling well for nonturbulent feed of the acid-polymer mix. Underflow from the clarifier may be about 8% by volume of the feed. It is returned to the phosphoric acid plant, e.g., to the reactor or to the filter. Or it may be discarded. (It contains 4% $P_2O_5$ or less.)

Clarification is carried out at ambient temperatures or at plant temperatures, e.g., about 64° C. (149° F.).

The retention time in the clarifier, depending on the feed rate to the clarifier, is typically about 60 to 90 minutes.

Depending on the grade of rock used for digestion in the conventional acid plant there may be times when a small amount of the flocculated material will float rather than sink. To overcome this a baffle may be placed in front of the overflow weir in the clarifier, plus a skimming device such as shown on page 19-50 of *Chemical Engineers Handbook*, Perry, Chilton and Kirkpatrick, 4th Edition, McGraw-Hill Book Co., New York. This float material after skimming may be combined with the underflow, outside of the clarifier, for ultimate disposal.

In addition to using a perlite filter bed (or the equivalent) on the ion exchange bed (an essential feature of this invention) I prefer also to mix filter grade perlite into the clarified phosphoric acid feed. When added in this way, the perlite tends to make a preliminary adsorption of some of the colloids and organics not removed in the prior clarification with sodium compound and flocculant polymer. This added perlite is picked on the perlite bed on the ion exchange resin bed. When I make this addition, I add about 0.01 to 0.5 wt. % perlite based on the weight of crude acid.

The above procedure was used in preparing a clarified acid feed, as follows. Number One filtrate was taken direct from a wet process phosphoric acid plant. The analysis as received is given in Column 1 of the table following. This acid was treated with sodium carbonate at the rate of about 1 lb. sodium carbonate 100 lbs. $P_2O_5$ in the acid. The treatment was done simply by adding the sodium carbonate to the acid, with stirring. Next, an aqueous solution of polyacrylamide flocculant (Polyhall, Stein, Hall & Co.) was made up, 0.1% in water, and this was mixed with the acid at the rate of 0.8% by volume of acid. The mixing was done in a launder as above described, and then the treated acid was fed to a clarifier as above described. The analysis of this acid is given in Col. 2. The clarifier overflow was used as treated preclarified acid and had the analysis given in Column 3 of the following table. The clarified acid was used as feed in Example 1.

TABLE 1

|  | Col. 1[1] Raw feed | Col. 2[2] Treated Feed | Col. 3[3] Clarifier overflow | Col. 4 Clarifier underflow |
|---|---|---|---|---|
| $P_2O_5$ | 30.00 | 28.50 | 29.60 | 22.20 |
| CaO | 0.60 | .92 | 0.23 | 4.51 |
| $SiO_2$ | 0.72 | .71 | 0.56 | 1.54 |
| $Fe_2O_3$ | 1.25 | 1.18 | 1.11 | 1.80 |
| $Al_2O_3$ | 0.88 | .80 | 0.83 | 0.83 |
| F | 1.70 | 1.52 | 1.24 | 3.28 |
| $H_2SO_4$ | 3.00 | 3.30 | 2.30 | 2.50 |
| MgO | 0.34 | 0.39 | 0.37 | 0.37 |
| Solids | 2.23 | 2.43 | 0.10 | 24.92 |
| $Na_2O$ | 0.14 | .21 | 0.08 | 1.28 |
| $K_2O$ | 0.06 | 0.06 | 0.04 | 0.19 |

[1] Raw feed, No. 1 filtrate.
[2] Raw feed treated with sodium carbonate and polyacrylamide, as fed to clarifier.
[3] Clarifier overflow, as fed to ion-exchange column, Ex. 1.

Test Bed

It is evident that a given resin will work effectively with a given acid feed only for a limited time, and that thereafter Mg removal will begin to fall off, and will continue to fall off until the bed has taken up all the Mg it will take up. The change in Mg level in the product acid can, of course, be followed by periodic sampling of the effluent, and in a commercial plant this would normally be done in any case. However, it is often desired for experimental, bench scale, and pilot plant runs to make a quick estimate of the behavior of a given resin vis-a-vis a given crude acid feed, so that this behavior can be translated into projected larger-scale operations. This can readily be done in a small test column, e.g., 1"×60". The test column carried a minimum depth of about 30" of resin and was arranged similarly to the 4" column above. The actual volume of the resin, 444.2 cc, was measured by filling the bed with water, draining off and measuring the water, and taking the difference as the volume of the bed residue. The resin was the same as that used in Example 1.

In one calibrative run using the 1" test column, the following data were obtained.

The feed was No. 1 filtrate, not treated with sodium carbonate or flocculant polymer, but clarified by filtration. It contained 27.7% $P_2O_5$ and 0.48% MgO, plus other impurities commonly found in wet process phosphoric acid.

A total of 1800 ml. of feed was passed through the column, and all of the effluent was collected as 150-ml samples and analyzed, except the first, which was discarded. Thus the effluent acid was collected in 150 ml. increments per the following schedule.

TABLE 2

| Time | Sample No. | MgO wt % | $P_2O_5$ wt. % |
|---|---|---|---|
| 09 10 | 1 | — | — |
| 09 36 | 2 | 0.01 | 12.7 |
| 10 08 | 3 | 0.01 | 22.0 |
| 10 31 | 4 | 0.01 | 26.2 |
| 10 55 | 5 | 0.01 | 29.0 |
| 11 20 | 6 | 0.04 | 29.1 |
| 11 40 | 7 | 0.17 | 29.4 |
| 12 05 | 8 | 0.33[1] | 29.0 |
| 12 28 | 9 | 0.42[1] | 29.3 |
| 12 45 | 10 | 0.46[1] | 29.1 |
| 13 07 | 11 | 0.47[1] | 29.3 |
| 13 30 | 12 | 0.48[1] | 29.2 |

[1] Added ¼ teaspoon filter grade perlite to feed.

After the 12th sample was taken, the bed was rinsed and backwashed with water.

The above data indicate that the bed "break point" came during the 6th sample; i.e., that the bed worked best at a total of 750 ml of feed (including the initial discard) with 444 cc of resin, or about 1.7 ml/cc. It is, of course, perfectly feasible to select a higher breakpoint. Indeed, as noted, the bed continued to remove some Mg right up to the very last sample.

Indeed, the breakpoint might well have been selected at the end of the 7th sample, where the MgO in the effluent had risen to 0.17%. The reason for this is as follows. Assuming a maximum allowable MgO of 0.45% in the acid after it is concentrated to 70%, it would then follow that the maximum amount of MgO in the effluent acid would be the unknown in the simple proportion:

$$x/29.4 = 0.45/70,$$

where x is 0.189%. Thus the actual MgO of 0.17% for the seventh sample was within the 0.189% MgO permissible.

Another way to state a suitable breakpoint is the following. Assume that, for 70% $P_2O_5$ superacid, MgO should not exceed 0.45%. This means this is an MgO:$P_2O_5$ ratio of 0.45:70, or 0.0064. Thus this value can be accepted as the maximum break point ratio for dilute feeds, since the ratio will remain a constant as the acid is concentrated up to 70% $P_2O_5$. In this case, it will be evident that a breakpoint of up to 0.0064×29.4 or 0.188% MgO would be acceptable, since this would give 0.188 70/29.4 or 0.448%.

Some Modifications

More concentrated feeds can be used, subject to the following observations: (1) As $P_2O_5$ feed content goes up, the efficiency of the resin bed drops. At 42% $P_2O_5$, I take out about 60% of the Mg. For a $P_2O_5$ content of 60%, recovery of the MgO may drop to 32%. (2) Above about 34% $P_2O_5$, the resin bed may "invert". The reason for this is that the specific gravity of the resin bed is typically about 1.38, whereas the specific gravity of 34% acid slightly exceeds this, as a result of which the bed tends to float in the acid. The matter is remedied readily by simply introducing the feed at the bottom of the resin chamber.

I claim:

1. The method of removing Mg from crude wet-process phosphoric acid by passing the acid through a strong acid ion exchange resin bed characterized in that
   (a) the phosphoric acid feed analyzes about 20 to 35% $P_2O_5$ and about 0.18 to 0.65 Mg as MgO, and is preclarified with sodium carbonate and a polyacrylamide flocculant to remove substantially all suspended organic and inorganic materials;
   (b) a coating of a filter aid is added to inlet side of the resin bed prior to passage of the feed through the bed, to provide a filter cake for the collection of solids;
   (c) the bed is back-washed to a point just below the layer of filter cake and solids, thereby disturbing the solids on top of the layer of filter aid as well as disturbing the filter aid;
   (d) the solids on top of the layer of filter aid are removed; and
   (e) the resin bed is back-washed at a rate sufficient to rearrange the resin beads so as to minimize short-circuiting during the next cycle.

2. Method according to claim 1 in which the phosphoric acid feed analyzes about 25–32% $P_2O_5$ and about 0.31–0.4% Mg as MgO.

3. Method according to claim 1 in which the filter aid is filter grade perlite.

4. Method according to claim 1 in which, after the crude acid is passed through the bed, the bed is flushed cocurrently with about 2.0 to 8.0% sulfuric acid to flush out residual phosphoric acid, counter currently flushed with about 2.0 to 8.0% sulfuric acid, and then regenerated with about 8.0 to 25.0% sulfuric acid.

5. Method according to claim 4, in which the acids collected in flushing and regeneration are recovered and sent to a second train in a wet process phosphoric acid plant.

6. Method according to claim 1 in which the sodium carbonate is added, in an amount of about 1% by weight of $P_2O_5$ in the acid, and the polyacrylamide is added as a 0.1% aqueous solution, 0.008 volume of said aqueous solution/volume of the acid.

7. Method according to claim 1, in which the passage of acid through the resin bed is continued until the Mg as MgO in the exit acid is substantially the same as the Mg in the feed acid.

8. Method according to claim 1, in which the passage of acid through the resin bed is discontinued when the Mg as MgO in the exit acid reaches a predetermined break point, less than the Mg in the feed acid.

9. Method according to claim 1 in which the flow of crude acid through the resin bed is discontinued before the $MgO:P_2O_5$ ratio in the effluent rises above about 0.0064.

10. Method according to claim 1 in which filter aid is added to the clarified phosphoric acid feed in an amount of about 0.01–0.5 wt. % filter aid/feed.

11. Method according to claim 10 in which the filter aid is filter grade perlite.

12. Method according to claim 1 in which the phosphoric acid feed analyzes about 25–32% $P_2O_5$ and about 0.31–0.4% Mg as MgO, the filter aid is filter grade perlite, the sodium compound is sodium carbonate, added in an amount of about 1% by weight of $P_2O_5$ in the acid, and the flocculant is polyacrylamide, added as a 0.1% aqueous solution, 0.008 volume of said aqueous solution/volume of the acid, and the passage of acid through the resin bed is discontinued when the Mg as MgO in the exit acid reaches a predetermined break point, less than the Mg in the feed acid.

* * * * *